US00RE37535E

(19) United States
(12) Reissued Patent
Avery et al.

(10) Patent Number: US RE37,535 E
(45) Date of Reissued Patent: Feb. 5, 2002

(54) HEALTH IMPROVEMENT DEVICE FOR MODIFYING A DAILY BEHAVIOR BY REMINDING A PERSON TO TAKE MEDICATION

(75) Inventors: Allan R. Avery, New Canaan; Lawrence H. Bernstein, Storrs, both of CT (US)

(73) Assignee: Rxtra Inc., Norwalk, CT (US)

( * ) Notice: This patent issued on a continued prosecution application filed under 37 CFR 1.53(d), and is subject to the twenty year patent term provisions of 35 U.S.C. 154(a)(2).

(21) Appl. No.: 09/478,850

(22) Filed: Jan. 6, 2000

Related U.S. Patent Documents

Reissue of:
(64) Patent No.: 5,839,578
Issued: Nov. 24, 1998
Appl. No.: 08/822,756
Filed: Mar. 24, 1997

(51) Int. Cl.[7] ..... B65D 83/10
(52) U.S. Cl. ..... 206/362.2; 206/362.3; 206/528; 132/309

(58) Field of Search ..... 206/15.3, 216, 206/362.1, 362.2, 362.3, 528; 132/308, 309

(56) References Cited

U.S. PATENT DOCUMENTS

| | | | | |
|---|---|---|---|---|
| 571,436 | A | 11/1896 | Glentworth | |
| 612,296 | A | 10/1898 | Woodward | |
| 675,364 | A | 5/1901 | Burton | |
| 1,261,585 | A | 4/1918 | Mayo | |
| 1,649,814 | A * | 11/1927 | Lellis | 132/309 |
| 1,710,642 | A | 4/1929 | Hammet | |
| 2,099,906 | A | 11/1937 | Reese et al. | |

(List continued on next page.)

*Primary Examiner*—David T. Fidei
(74) *Attorney, Agent, or Firm*—Dinesh Agarwal, P.C.

(57) ABSTRACT

A health improvement device for modifying a daily behavior by reminding a person to take medication includes a generally vertically upstanding housing. The housing includes first and second adjoining sections. The first section is provided to removably hold an instrument, such as a toothbrush, for use in a daily activity. The second section is provided for holding a material, such as medication, to be taken by the person. When a person reaches to use the toothbrush, for example, the person is reminded to take the medication due to its proximity in the second section.

22 Claims, 6 Drawing Sheets

U.S. PATENT DOCUMENTS

| | | | | | |
|---|---|---|---|---|---|
| 2,232,171 | A | | 2/1941 | Fleenor | |
| 2,415,447 | A | | 2/1947 | Stanton | |
| 2,417,874 | A | | 3/1947 | Kehl | |
| 2,432,764 | A | | 12/1947 | Jenkins | |
| 2,444,486 | A | | 7/1948 | Aschenier | |
| 2,450,337 | A | | 9/1948 | Hearst | |
| D154,689 | S | * | 8/1949 | Lundgren | 206/362.1 |
| 2,570,380 | A | | 10/1951 | Rosier | |
| 2,579,695 | A | * | 12/1951 | Parsons | 132/309 |
| 2,608,294 | A | | 8/1952 | Ward | |
| 2,956,851 | A | | 10/1960 | Merendino | |
| 3,228,737 | A | | 1/1966 | Kipnis | |
| 3,521,936 | A | | 7/1970 | Coker, Jr. | |
| 3,524,690 | A | | 8/1970 | Gurney | |
| 3,762,673 | A | | 10/1973 | Koslovsky | |
| 3,880,281 | A | | 4/1975 | Taddei | |
| 3,884,635 | A | | 5/1975 | Sloan | |
| 3,921,649 | A | * | 11/1975 | Milbrath | 132/308 |
| D246,489 | S | | 11/1977 | Cunningham | |
| 4,068,760 | A | | 1/1978 | Johnson, Jr. | |
| 4,116,508 | A | | 9/1978 | Sturtevant | |
| 4,140,140 | A | | 2/1979 | Proia et al. | |
| 4,219,035 | A | | 8/1980 | Deconinck | |
| 4,248,254 | A | | 2/1981 | Trimble | |
| 4,307,923 | A | | 12/1981 | Raz | |
| 4,466,150 | A | | 8/1984 | Jurt | |
| 4,681,219 | A | | 7/1987 | Kitchens | |
| 4,874,099 | A | | 10/1989 | Arnott et al. | |
| 4,951,596 | A | | 8/1990 | Wallace, Jr. | |
| 4,964,683 | A | | 10/1990 | Sugarek et al. | |
| 4,978,003 | A | | 12/1990 | Foster | |
| 5,033,709 | A | | 7/1991 | Yuen | |
| 5,072,477 | A | | 12/1991 | Pai | |
| 5,183,163 | A | | 2/1993 | Slaiken | |
| 5,215,193 | A | * | 6/1993 | Dennis | 132/309 |
| 5,271,353 | A | | 12/1993 | Besthorne | |
| D344,763 | S | | 3/1994 | Vitantonio et al. | |
| 5,507,414 | A | | 4/1996 | Ong | |
| 5,522,497 | A | | 6/1996 | Stacy | |
| 5,560,578 | A | | 10/1996 | Schenken et al. | |
| D389,686 | S | | 1/1998 | Drage | |
| D405,996 | S | | 2/1999 | Mickler et al. | |
| D407,250 | S | | 3/1999 | Avery et al. | |
| D407,756 | S | | 4/1999 | Avery et al. | |
| D417,469 | S | | 12/1999 | Avery et al. | |
| 6,053,338 | A | | 4/2000 | Avery et al. | |

* cited by examiner

HEALTH IMPROVEMENT DEVICE FOR MODIFYING A DAILY BEHAVIOR BY REMINDING A PERSON TO TAKE MEDICATION

Matter enclosed in heavy brackets [ ] appears in the original patent but forms no part of this reissue specification; matter printed in italics indicates the additions made by reissue.

FIELD AND HISTORICAL BACKGROUND OF THE INVENTION

The present invention is directed to a health improvement device, and more particularly to a device which modifies a daily behavior by reminding a person to take medication, as directed by the doctor.

It has been observed by medical professionals and other behavior scientists that remembering to take prescription or other medication, day after day, is a routine that is usually hard to establish. In this regard, it is known that taking medication at prescribed intervals or time is not only important, but in many instances, could be critical. The failure of a person to take the medication, as prescribed, may have adverse impact on the health of a person. It is therefore important that a simple and easy to use device be provided which reminds a person to take the medication.

Various examples of conventional devices of this nature and various medicine containers are disclosed in U.S. Pat. Nos. 571,436; 675,364; 612,296; 2,450,337; 2,570,380; 2,608,294; 3,228,737; 3,521,936; 3,524,690; 3,884,635; 4,140,140; 4,116,508; 4,248,254; 4,307,923, 4,308,923; 4,466,150; 4,951,596; 5,072,477; and 5,271,353.

The conventional devices are not as simple to use as the device of the present invention and not versatile.

OBJECTS AND SUMMARY OF THE INVENTION

The main object of the present invention is to provide a simple to use and an inexpensive health improvement device which modifies a person's daily behavior by reminding the person to take medication, as directed.

An object of the present invention is to provide a health improvement device which overcomes the disadvantages associated with the conventional devices.

Another object of the present invention is to provide a health improvement device which creates a simple association between the daily habit of toothbrushing and another habit a doctor wants each patient to develop, that is of taking medication properly.

Yet another object of the present invention is to provide a health improvement device which reminds the patient, when reaching his or her toothbrush, to take medication at the same time.

Still another object of the present invention is to provide a health improvement device which allows the medication to work as it should, since it is being taken as prescribed by the doctor, for example, once daily in the morning, or both morning and at night.

Still yet another object of the present invention is to provide a health improvement device which results in better compliance and more effective therapy and therefore saves needless medical visits and extra costs for the patient and the insurance provider.

An additional object of the present invention is to provide a health improvement device which is versatile in that it can be reused with different medicine containers. In other words, once the medication supply is exhausted, the device can be reused with other medicine containers.

In summary, the main object of the present invention is to provide a health improvement device which is simple, inexpensive, versatile and modifies a person's daily behavior to serve as a reminder to take a prescription medication, as directed.

BRIEF DESCRIPTION OF THE DRAWINGS

The above and other objects and advantages and novel features of the present invention will become apparent from a review of the preferred and alternative embodiments of the invention, as illustrated in the drawings, in which.

DETAILED DESCRIPTION OF THE PREFERRED AND ALTERNATIVE EMBODIMENTS OF THE INVENTION

Figure 1:
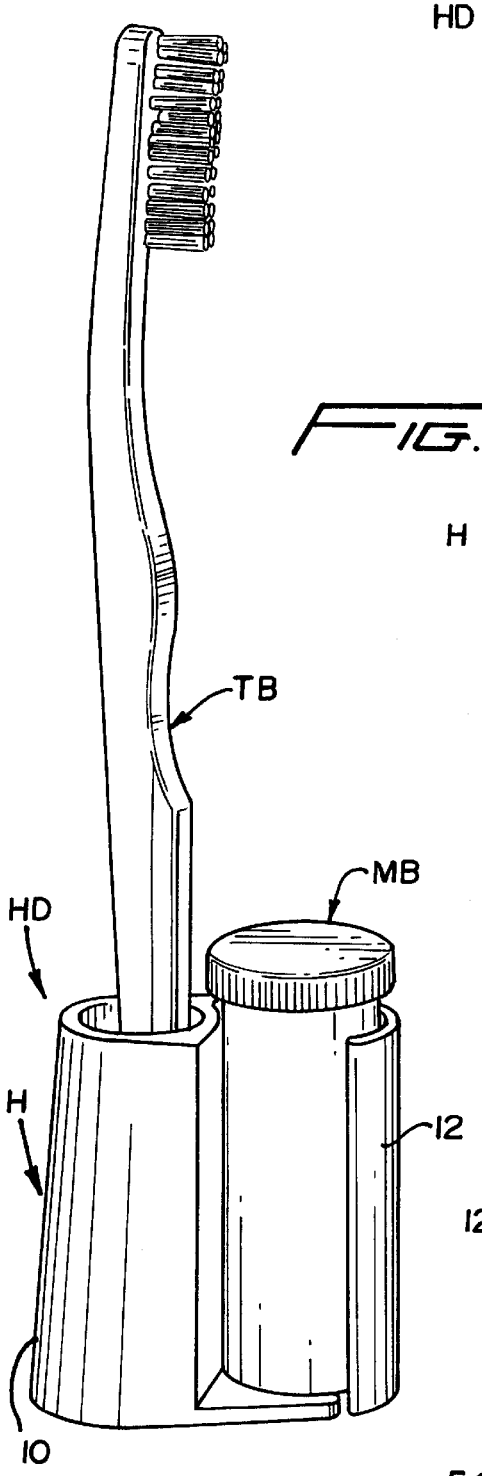
FIG. 1 a front elevational view of the health improvement device of the present invention, shown with toothbrush and a medicine bottle.
Figure 2:
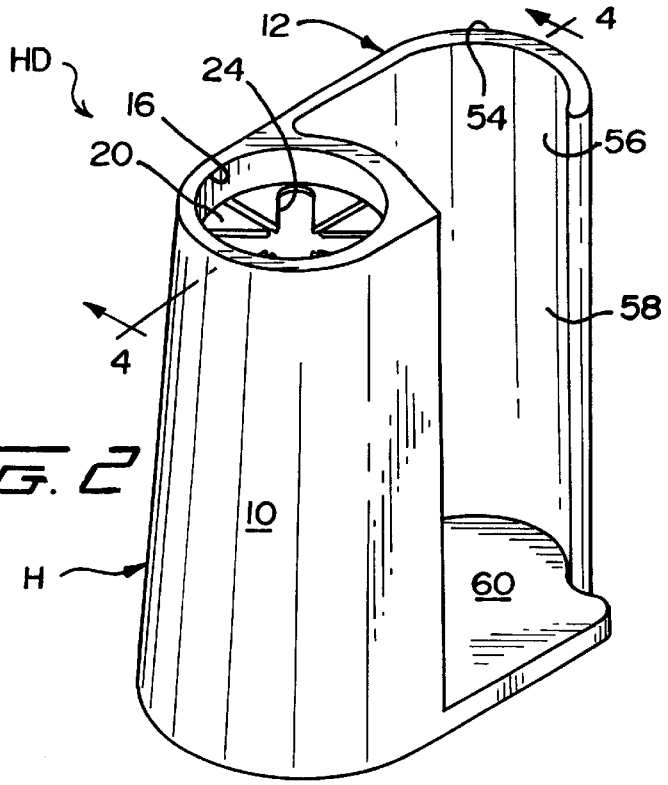
FIG. 2 is an enlarged perspective view of the health improvement device shown in FIG. 1.

As best shown in FIGS. 1–2, the health improvement device HD of the present invention is in the form of a generally vertically upstanding housing H. The housing H is preferably made of conventional materials, such as polyvinyl chloride (PVC), polypropylene, any high density polyethylene or the like, thermoplastic, or other suitable material, which may be easily molded, blown or otherwise shaped to obtain the desired configuration.

Housing H is of a unitary construction and includes a generally cylindrical, hollow section 10 and a generally cylindrical open recess section 12. As can be seen from FIGS. 1, 2 and 4, the height of first and second sections 10 and 12 is substantially the same. It is, however, noted that the corresponding heights of these two sections may be varied, if necessary. As can be seen from FIG. 1, the section 10 is provided for receiving an instrument, such as a toothbrush, and holding it securely and generally vertically therein. The second, adjoining section 12, is provided for and has the configuration to removably hold a conventional medicine bottle MB.

Figure 4:
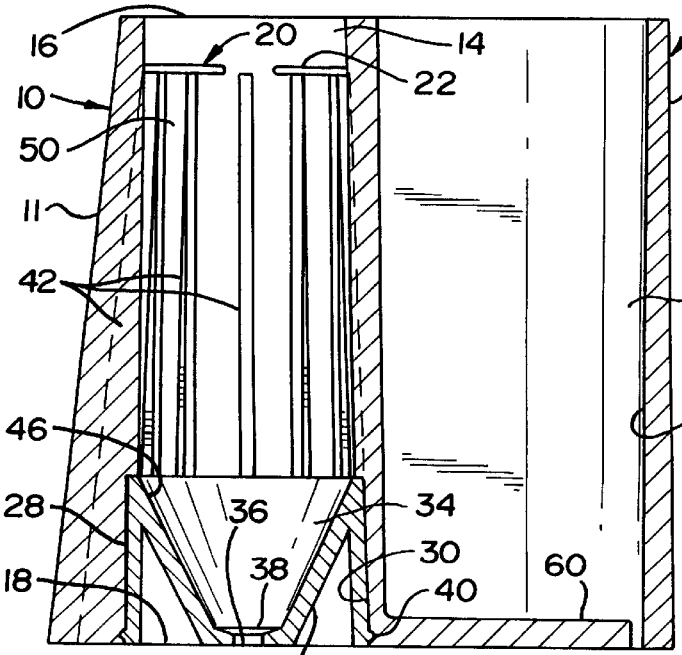
FIG. 4 is a vertical cross-sectional view taken along line 4—4 of FIG. 2.
Figure 6:
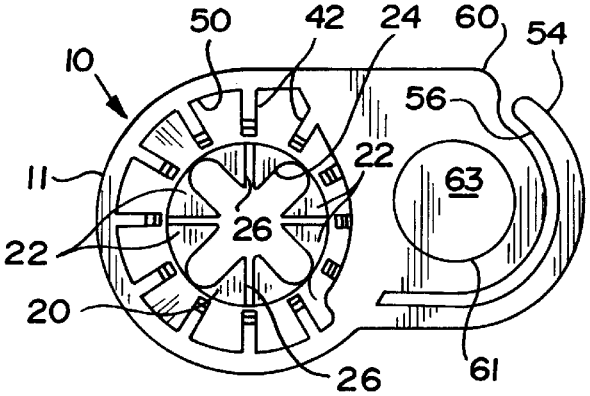
FIG. 6 is a bottom plan view of the device shown in FIG. 2.

As best shown in FIG. 4, section 10 includes recess 14 which extends the height of the housing H and terminates at top opening 16 and bottom opening 18. As best shown in FIGS. 2, 4 and 6, a generally round, alignment plate member 20 is provided in the recess 14, adjacent top opening 16. The plate 20 includes four pairs of generally triangularly shaped, radially extending projections 22. As best shown in FIG. 6, the projections 22 extend toward the center of housing H and are arranged in a manner so as to form a generally +-shaped recess 24. The configuration of recess 24 is such that the handle of toothbrush TB would slide easily in and out therefrom. As further shown in FIG. 6, each pair of projections 22 is separated by a narrow slit 26 for imparting plate 20 bending flexibility. This flexibility is preferred for the ease of inserting and removing toothbrush TB. It should be noted herewith that the overall structure and configuration of plate member 20 may be varied, keeping in mind the main objective of properly aligning toothbrush TB, and to facilitate its insertion and removal from housing H.

Figure 3:
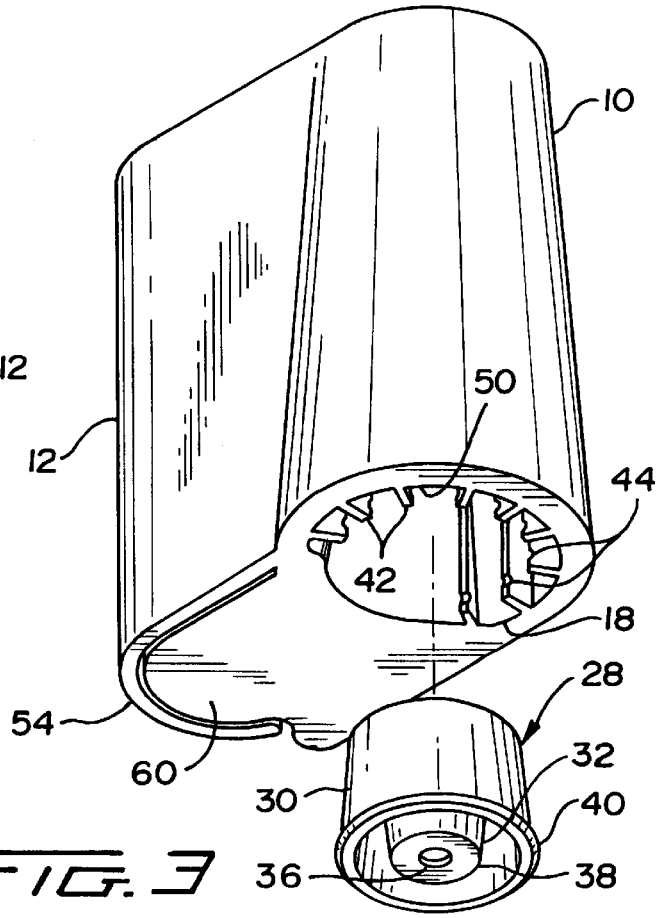
FIG. 3 is a bottom perspective view of the device shown in FIG. 2, shown partially exploded with the drainage plug removed.

As best shown in FIGS. 3 and 4, a generally cylindrical alignment/drainage plug 28 is removably secured in the bottom of housing H. As best shown in FIG. 4, alignment plug 28 includes an outer peripheral section 30 and an inner generally funnel-shaped yoke section 32. The yoke 32 includes an inner recess 34 which is in communication with housing recess 14 on one end, and communicate with the exterior via drain hole 36. As best seen in FIG. 4, inner recess 34 terminates at the bottom 38, the diameter which is designed so as to accommodate the bottom of toothbrush handle. A circular projection 40 is provided on the external periphery 30 of plug 28. The projection 40 snaps into corresponding notches 44 in ribs 42, as described below.

The recess 24 in plate 20 is in general vertical alignment with yoke bottom 38, such that when toothbrush TB is placed in section 10, it is secured vertically therein. Moreover, when toothbrush TB is placed in section 10, after brushing teeth, for example, any liquid or moisture present thereon drips downwardly in yoke 32, and due to its generally conical inner wall 46, gets collected at bottom 38 and flows outwardly through drain hole 36.

As best shown in FIGS. 3 and 4, a preselected number of vertically extending reinforcing ribs 42 are provided on the interior wall 50 of section 10. The ribs 42 are circumferentially placed on interior wall 50, extend radially into recess 14, and are preferably diametrically equidistant from one another. Although it is preferable that twelve ribs 42 be provided, it is well within the scope of this invention to vary the number thereof, as desired. The ribs 42 are preferably integrally molded with housing H and extend from about the bottom opening 18 up to the location of plate member 20. As best shown in FIG. 4, the radial length of ribs 42 is widest at the bottom and tapers upwardly. As best shown in FIG. 6, the radial length of some of the ribs located adjacent section 12, is less than the length of ribs 42 on the opposite side thereof. This is due to the fact that left wall 11 of section 10 flares outwardly from adjacent top opening 16 to bottom opening 18 (FIG. 4).

Figure 5:
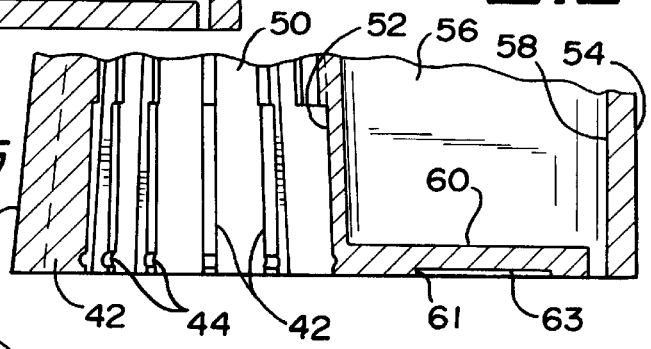
FIG. 5 is a partial view of the device shown in FIG. 4, shown without the drainage plug.

As best shown in FIG. 5, ribs 42 are cut into at 52 for receiving alignment plug 28. The length of each cutout 52 corresponds to the vertical height of plug 28. As noted above, each rib 42 is provided with a notch 44 substantially at the same location for receiving projection 40 of plug 28.

In regard to second section 12, it is in the general configuration of a clip defined by a generally C-shaped, wrap around vertical wall 54. As best shown in FIG. 2, wall 54 partially encloses an open recess 56, such that a front opening 58 is provided. The shape and configuration of wall 54 is selected so as to hold a conventional medicine bottle or container MB. The medicine bottle MB is easily inserted into recess 56 from the top of housing H.

The provision of front opening 58 allows the information on the medicine bottle MB, which is generally pasted thereon by a pharmacist, to remain visible and, therefore, further enhances the probability that the user would be reminded of taking the prescribed medication, as directed. Although as shown in the figures herein, the height of the C-shaped wall is substantially the same as first section 10, it is well within the scope of this invention to vary its dimensions, shape or configuration, as may be desired.

As best shown in FIGS. 2 and 4–6, section 12 further includes a bottom 60 for supporting the medicine bottle MB. Further, reference numeral 61 in FIG. 6 illustrates a recess for receiving an insert 63 which displays product information, other indicia, etc.

Figure 7:
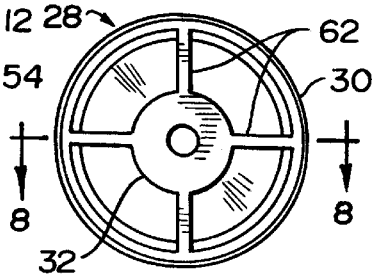
FIG. 7 is a bottom plan view of the drainage plug.
Figure 8:
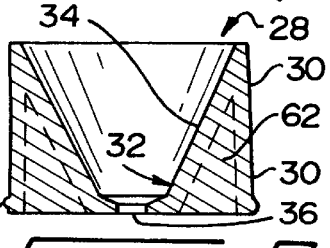
FIG. 8 is a cross-sectional view of the drainage plug taken along line 8—8 of FIG. 7.

As illustrated in FIGS. 7–8, the alignment/drainage plug 28 may additionally be provided with, preferably, four radial ribs 62 which extend between outer peripheral section 30 and yoke 32. The ribs 62 are equilaterally positioned to strengthen and provide structural integrity to plug 28.

Figure 9:
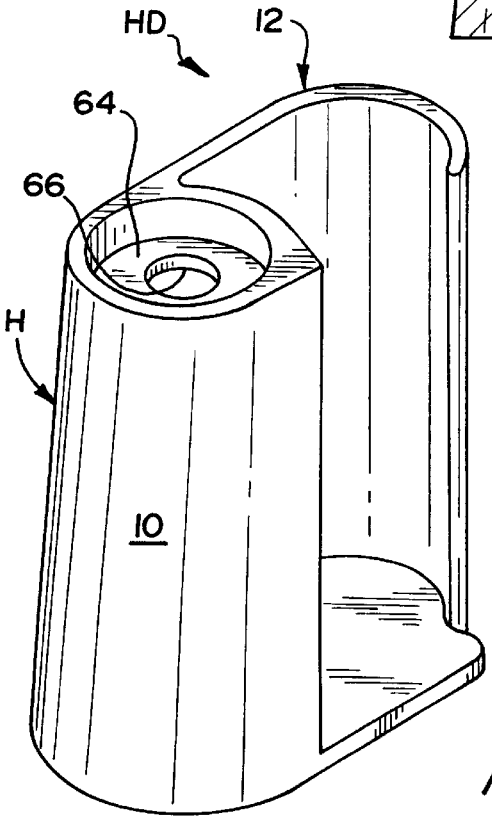
FIG. 9 is a first alternative embodiment of the device shown in FIG. 2.

FIG. 9 illustrates a first alternative embodiment of the present invention, which is similar to the health improvement device HD shown in FIGS. 1–6, with the exception that the structure of alignment plate member 64 is different. In particular, member 64, in the embodiment shown in FIG. 9, is in the form of a round plate with a generally round central opening 66 for receiving the handle of toothbrush TB.

It is noted herewith that in various embodiments illustrated herein, the like parts/components have been designated by using the same reference numerals for clarity.

Figure 10:
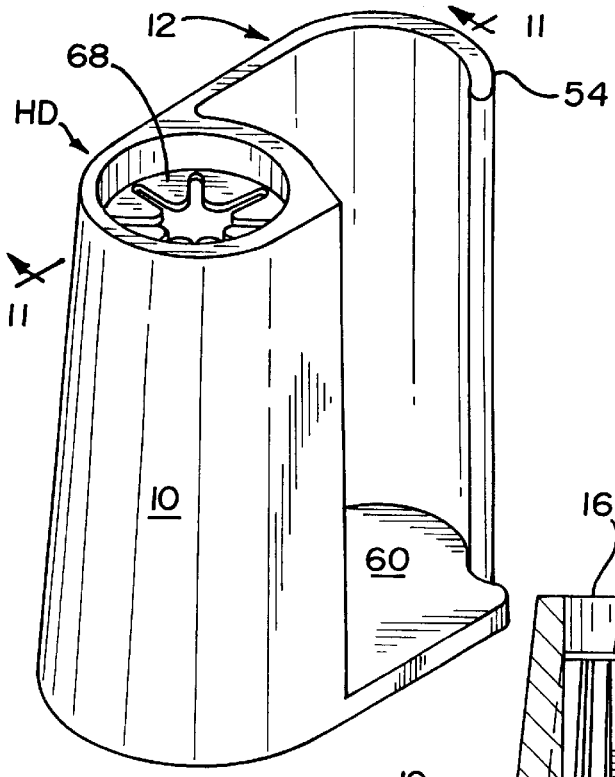
FIG. 10 is a second alternative embodiment of the device shown in FIG. 2.
Figure 11:
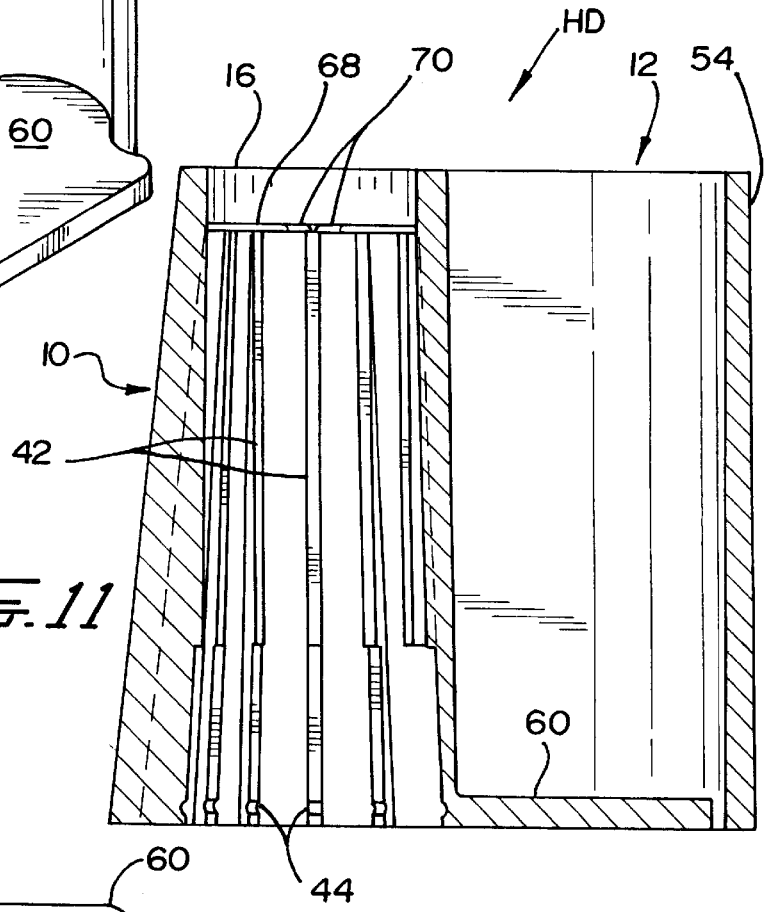
FIG. 11 is a vertical cross-sectional view taken along line 11—11 of FIG. 10.
Figure 12:
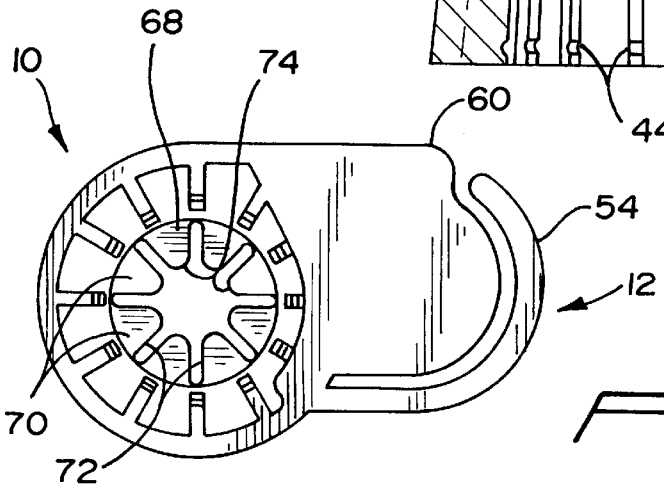
FIG. 12 is a bottom plan view of the device shown in FIG. 10, shown without the drainage plug.

FIGS. 10–12 illustrates a second alternative embodiment of the present invention, which is similar to the health improvement device HD shown in FIGS. 1–6, with the exception that the structure of alignment plate member 68 is different. In particular, member 68 includes preferably eight equilaterally spaced finger-like radial projections 70, which are separated from one another by slits 72. Further, projections 70 include generally rounded free ends 74 for facilitating the insertion and removal of toothbrush TB.

Figure 13:
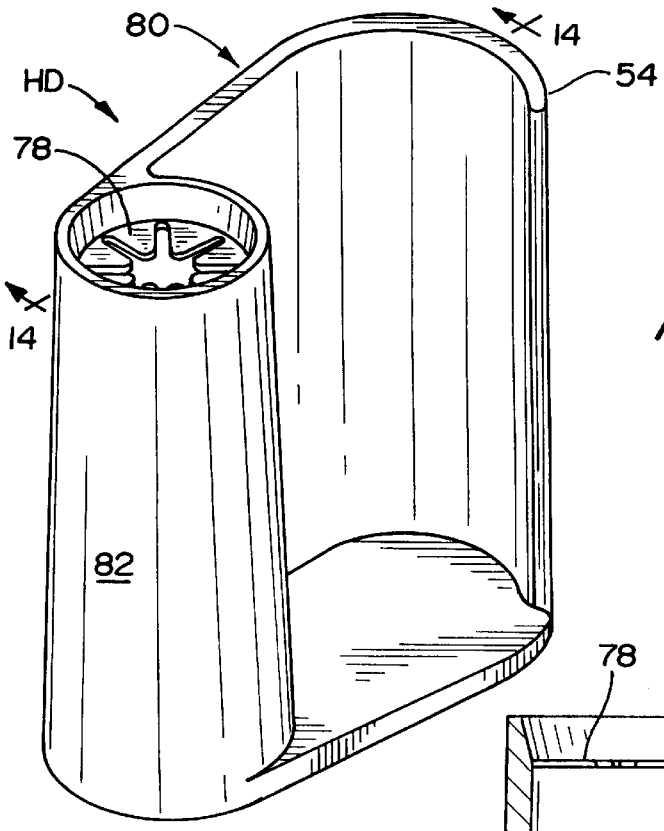
FIG. 13 is a third alternative embodiment of the device shown in FIG. 2.
Figure 14:
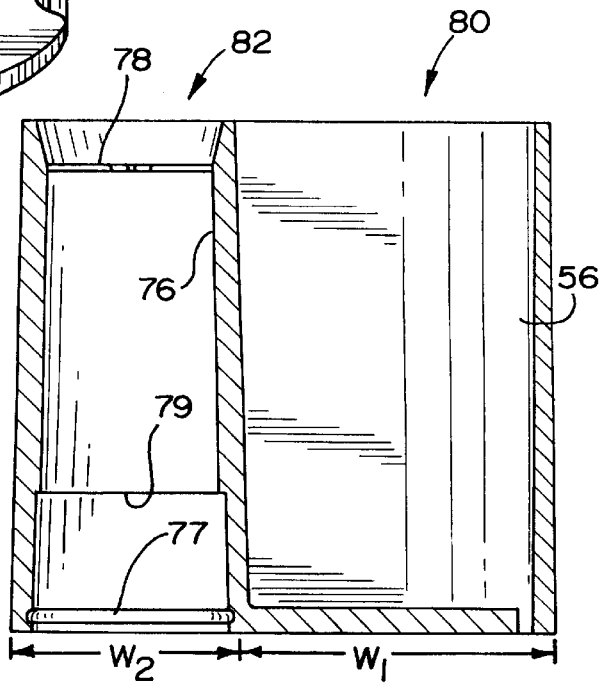
FIG. 14 is a vertical cross-sectional view taken along line 14—14 of FIG. 13.
Figure 15:
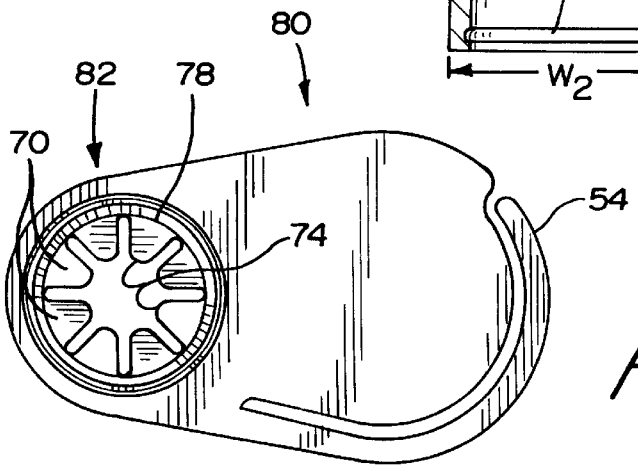
FIG. 15 is a bottom plan view of the device shown in FIG. 13, shown without the drainage plug.

FIGS. 13–15 illustrates a third alternative embodiment of the present invention, which is generally similar to the health improvement device HD shown in FIGS. 10–12, with the exception that the interior wall 76 does not include any ribs and is substantially smooth. A circular notch 77 is provided for receiving projection 40 of plug 28, and a cut-out recess 79, having the general dimensions of plug 28 is included in section 82. The structure and configuration of alignment plate 78 is similar to the embodiment shown in FIGS. 10–12. Further, the width $w_1$ of open recess section 80 is larger than the width $w_2$ of hollow section 82. Moreover, as best shown in FIG. 15, the diametric configuration and overall dimensions of section 80 are significantly larger than the diametric configuration and dimensions of hollow section 82. This configuration allows for a accommodating medium size medicine bottles.

Figure 16:
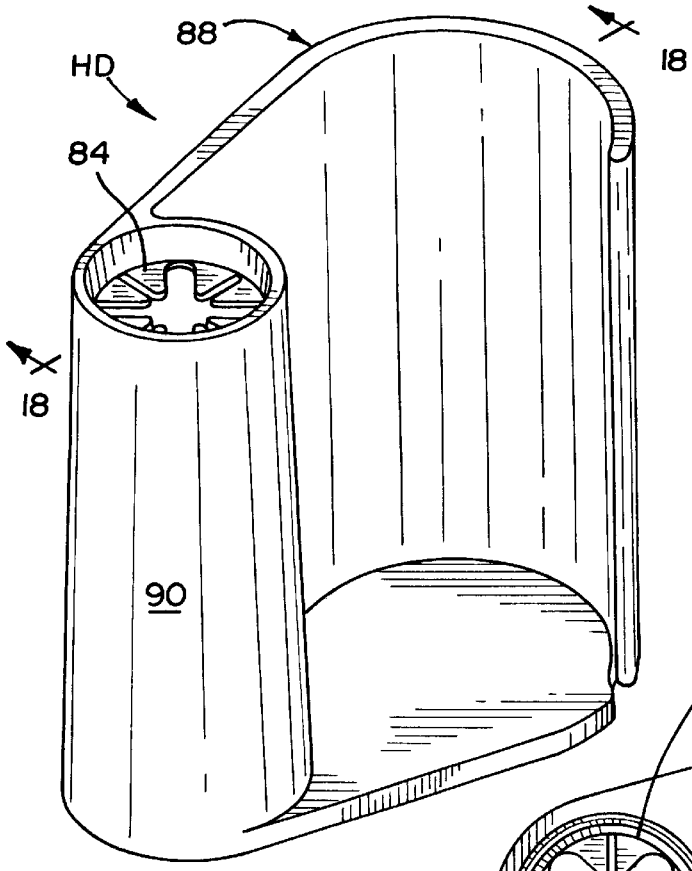
FIG. 16 is a fourth alternative embodiment of the device shown in FIG. 2.
Figure 17:
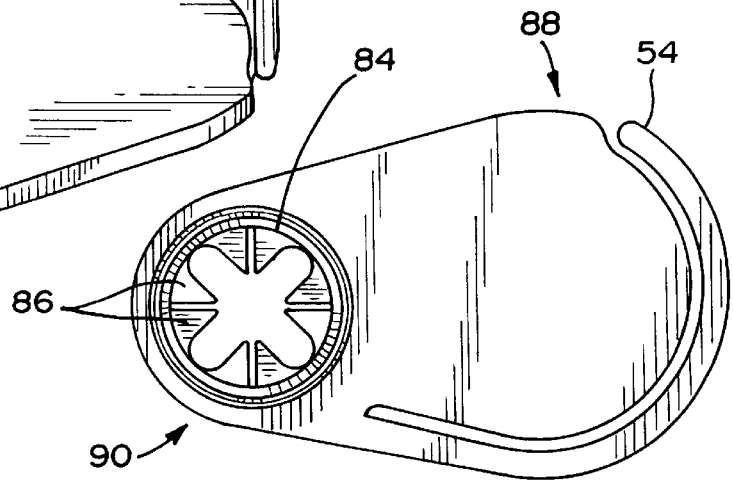
FIG. 17 is a bottom plan view of the device shown in FIG. 16, shown without the drainage plug.
Figure 18:
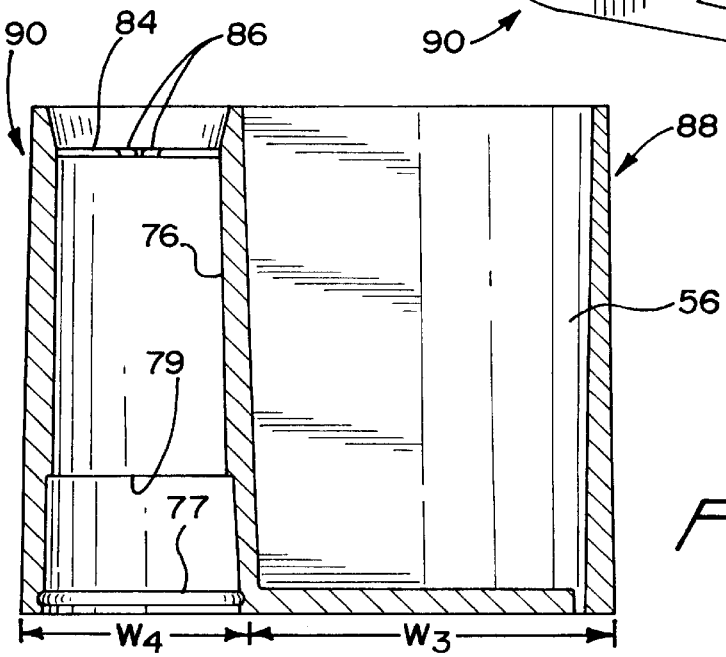
FIG. 18 is a vertical cross-sectional view taken along line 18—18 of FIG. 16.

FIGS. 16–18 illustrate a fourth alternative embodiment of the present invention, which is generally similar to the health improvement device HD shown in FIGS. 13–15, with the exception that the structure and configuration of alignment plate 84 is similar to the embodiment to the device shown in FIGS. 1–6. In particular, alignment plate member 84, preferably includes four pairs of radial projections 86 arranged in the like manner as in FIGS. 1–6. Further, the width $w_3$ of open recess section 88 is larger than the width $w_4$ of hollow section 90. Moreover, as best shown in FIG. 17, the diametric configuration and overall dimensions of section 88 are substantially larger than the diametric configuration and overall dimensions of hollow section 90. This configuration allows for accommodating large size medicine bottles.

Figure 19:
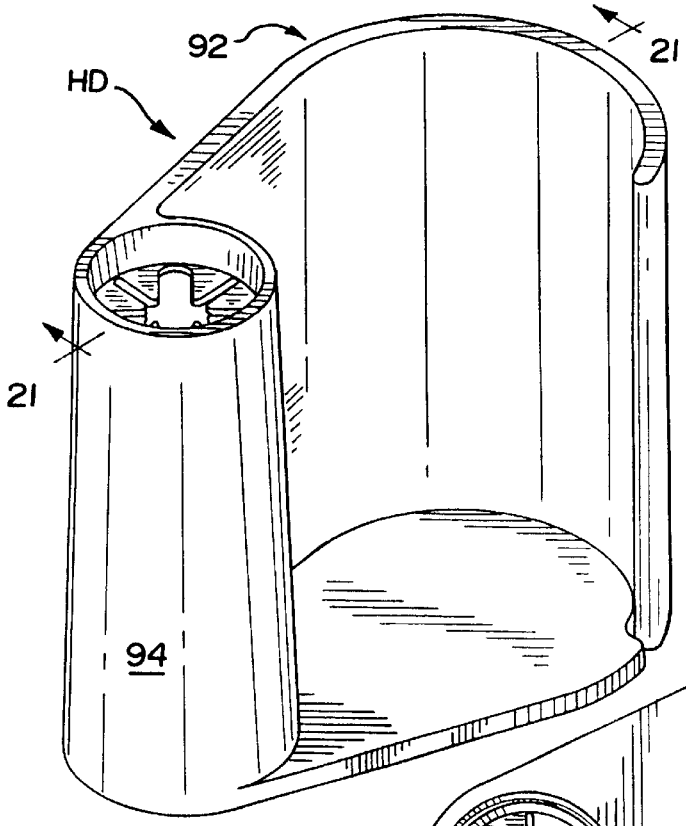
FIG. 19 is a fifth alternative embodiment of the device shown in FIG. 2.
Figure 20:
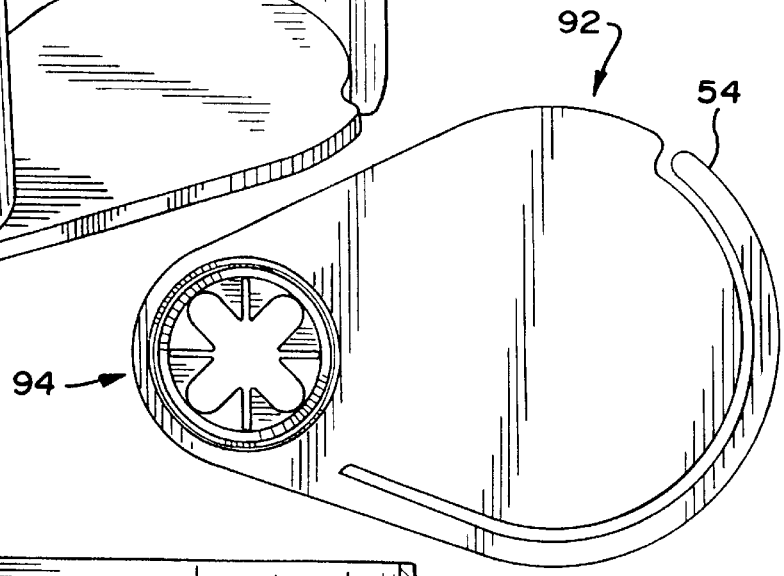
FIG. 20 is a bottom plan view of the device shown in FIG. 19, shown without the drainage plug.
Figure 21:
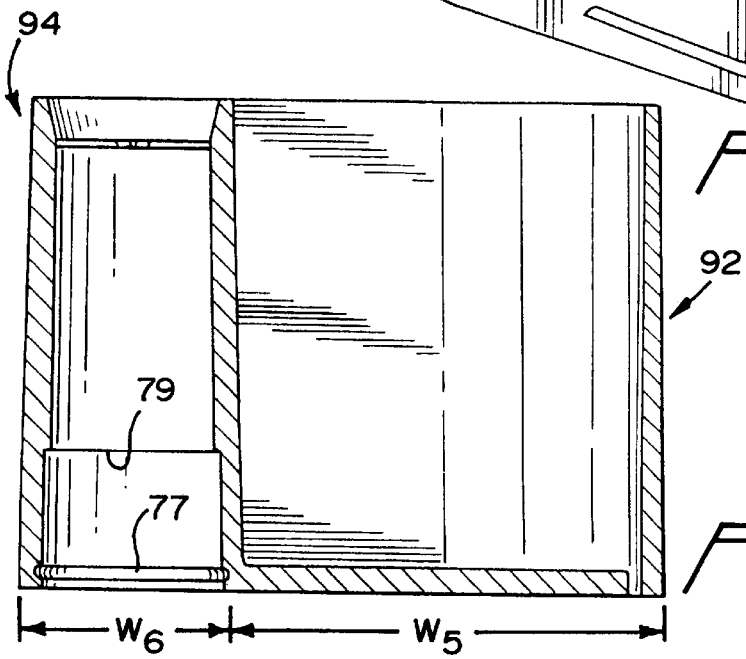
FIG. 21 is a vertical cross-sectional view taken along line 21—21 of FIG. 19.

FIGS. 19–21 illustrate a fifth alternative embodiment of the present invention, which is similar to the health improvement device HD shown in FIGS. 16–18, with the exception that the overall diametric configuration and overall dimensions of open recess section 92 are significantly larger than the diametric configurations and overall dimensions of hollow section 94. Likewise, the width $w_5$ of open section 92 is about twice or more than the width $w_6$ of hollow section 94. This configuration allows for accommodating extra large or the like medicine bottles or containers.

As can be easily seen from the above detailed description of the invention, as illustrated in the preferred and alternative embodiments, a person upon reaching for the toothbrush, is easily reminded of taking the medication concurrently, since the medicine bottle is located in close proximity to the toothbrush.

While this invention has been described as having preferred designs, it is understood that it is capable of further modifications, uses and/or adaptations following in general the principle of the invention, and including such departures from the present disclosure as those come within the known or customary practice in the art to which the invention pertains, and as may be applied to the central features hereinsetforth, and fall within the scope of the invention and the limits of the appended claims.

What is claimed is:

1. A health improvement device for modifying a daily behavior by reminding a person to take medication, comprising:

a) a generally vertically upstanding housing including first and second adjoining sections;

b) said first section including means for removably holding an instrument for use in a daily activity;

c) said second section including means for holding a material to be taken by person; [and]

d) said second section including an opening substantially across the front thereof for allowing continuous visual inspection of said material in said second section;

*e) said first section including top and bottom sections;*

*f) said first section including means for holding said instrument generally vertically therein;*

*g) said instrument holding means comprising a yoke member positioned in said bottom section of said first section; and*

[(e)]*h*) wherein when a person reaches to use said instrument, the person is reminded to take said material due to the proximity of said material holding means.

[2. The health improvement device of claim 1, wherein:

a) said first section includes top and bottom sections;

b) said first section includes means for holding said instrument generally vertically therein; and c) said instrument holding means comprises a yoke member positioned in said bottom section of said first section.]

3. The health improvement device of claim [2] *1*, wherein:

a) said instrument holding means further includes an opening in said top section of said first section.

4. The health improvement device of claim [2] *1*, wherein:

a) said yoke member is removably positioned in said bottom section.

5. The health improvement device of claim 3, wherein:

a) said opening is generally circular.

6. The health improvement device of claim [2] *1*, wherein:

a) said opening has the general configuration of a + sign.

7. The health improvement device of claim 1, wherein:

a) said first section is generally cylindrical in shape and includes a recess bound by an inside wall; and b) a plurality of vertically extending ribs are provided on said inside wall.

8. The health improvement device of claim 7, wherein:

a) said ribs extend generally vertically and substantially the height of said first section.

9. The health improvement device of claim 1, wherein:

a) said second section is generally cylindrical in shape and includes a recess therein.

10. The health improvement device of claim 1, wherein:

a) said second section comprises a generally C-shaped member for holding a container.

11. The health improvement device of claim 10, wherein:

a) said C-shaped member extends generally vertically and substantially the height of said second section.

12. The health improvement device of claim 1, wherein:

a) said housing is a single integral piece.

13. The health improvement device of claim 1, wherein:

a) said instrument comprises a toothbrush.

14. The health improvement device of claim 1, in combination with a toothbrush.

15. A health improvement device for modifying a daily behavior by reminding a person to take medication, comprising:

a) a generally vertically upstanding housing including integrally formed first and second adjoining sections;

b) said first section being generally cylindrical in shape and including a recess for removably holding a toothbrush generally vertically therein;

c) said second section including a medication holding container;

d) said second section including an opening substantially across the front thereof for allowing continuous visual inspection of the medication in said second section; and e) said first section including a drainage hole adjacent the bottom thereof;

e) wherein when a person reaches to use the toothbrush, the person is reminded to take the medication due to the proximity of the medication container.

16. The health improvement device of claim 15, wherein:

a) said second section comprises a generally C-shaped member.

17. The health improvement device of claim 16, wherein:

a) said C-shaped member extends generally vertically and substantially the height of said second section.

18. The health improvement device of claim 15, wherein:

a) said first section includes an inside wall; and b) a plurality of vertically extending ribs are provided on said inside wall.

19. A health improvement device for modifying a daily behavior by reminding a person to take medication, comprising:

a) a generally vertically housing including first and second adjoining sections;

b) said first section including means for removably holding an instrument for use in a daily activity;

c) said second section including means for holding a material to be taken by a person;

d) said first section including top and bottom sections;

e) said first section including means for holding said instrument generally vertically therein;

f) said instrument holding means including a yoke member positioned in said bottom section of said first section;

g) said instrument holding means including an opening in said top section of said first section;

h) said yoke member including a generally funnel-shaped recess; and i) said opening and said funnel-shaped recess being generally vertically aligned so as to keep said instrument generally vertical;

j) wherein when a person reaches to use said instrument, the person is reminded to take said material due to the proximity of said material holding means.

20. A health improvement device for modifying a daily behavior by reminding a person to take medication, comprising;

a) a generally vertically upstanding housing including first and second adjoining sections;

b) said first section including means for removably holding an instrument for use in a daily activity;

c) said second section including means for holding a material to be taken by a person;

d) said first section including top and bottom sections;

e) said first section including means for holding said instrument generally vertically therein;

f) said instrument holding means including a yoke member positioned in said bottom section of said first section;

g) said yoke member being removably positioned in said bottom section; and h) said yoke member including a drainage opening;

i) wherein when a person reaches to use said instrument, the person is reminded to take said material due to the proximity of said material holding means.

*21. A health improvement device for modifying a daily behavior by reminding a person to take medication, comprising:*

*a) a generally vertically upstanding housing including first and second adjoining sections;*

*b) said first section including means for removably holding an instrument for use in a daily activity;*

*c) said second section including means for holding a material to be taken by a person;*

*d) said second section including an opening substantially across the front thereof for allowing continuous visual inspection of said material in said second sections; and*

*e) said first and second sections being separated by an uninterrupted vertically extending wall;*

*f) wherein when a person reaches to use said instrument, the person is reminded to take said material due to the proximity of said material holding means.*

*22. A health improvement device for modifying a daily behavior by reminding a person to take medication, comprising:*

*a) a generally vertically upstanding housing including first and second adjoining sections;*

*b) said first section including a recess for removably holding an instrument for use in a daily activity;*

*c) said second section including a member for holding a material to be taken by a person;*

*d) said second section including an opening substantially across the front thereof for allowing continuous visual inspection of said material in said second section;*

*e) said first section including top and bottom sections; and*

*f) said first section including a yoke member positioned in said bottom section thereof for holding said instrument generally vertically therein;*

*g) wherein when a person reaches to use said instrument, the person is reminded to take said material due to the proximity of said material holding member.*

*23. A health improvement device for modifying a daily behavior by reminding a person to take medication, comprising:*

*a) a generally vertically upstanding housing including first and second adjoining sections;*

*b) said first section including a recess for removably holding an instrument for use in a daily activity;*

*c) said second section including a member for holding a material to be taken by a person;*

*d) said second section including an opening substantially across the front thereof for allowing continuous visual inspection of said material in said second section; and*

*e) said first and second sections being separated by an uninterrupted vertically extending wall;*

*f) wherein when a person reaches to use said instrument, the person is reminded to take said material due to the proximity of said material holding member.*

* * * * *